No. 889,672. PATENTED JUNE 2, 1908.
H. FERRIS & H. E. DIKEMAN.
BUNDLE CARRIER AND DROPPER FOR HARVESTING MACHINES.
APPLICATION FILED APR. 13, 1907.
2 SHEETS—SHEET 1.
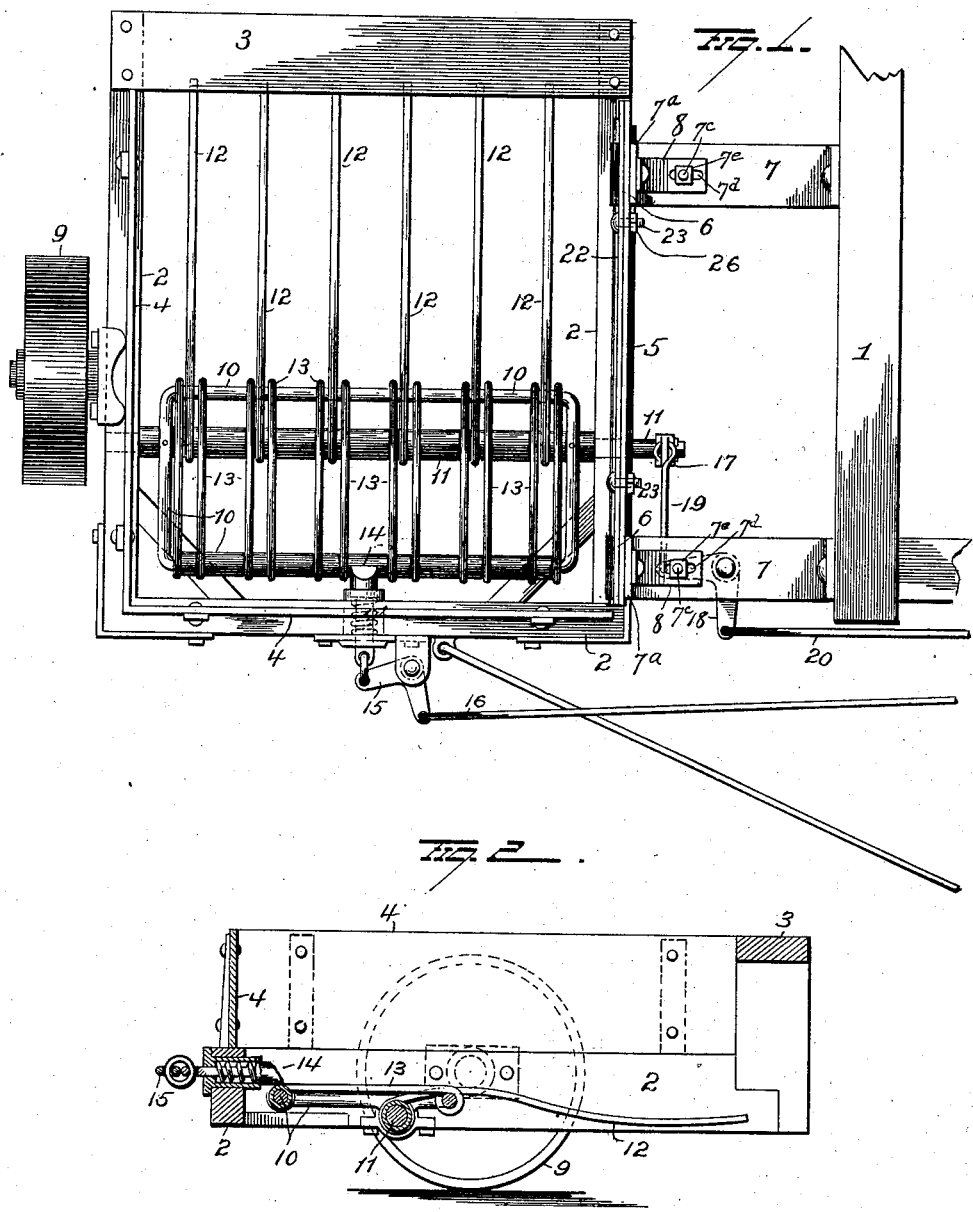
WITNESSES
INVENTORS No. 889,672. PATENTED JUNE 2, 1908.
H. FERRIS & H. E. DIKEMAN.
BUNDLE CARRIER AND DROPPER FOR HARVESTING MACHINES.
APPLICATION FILED APR. 13, 1907.
2 SHEETS—SHEET 2.
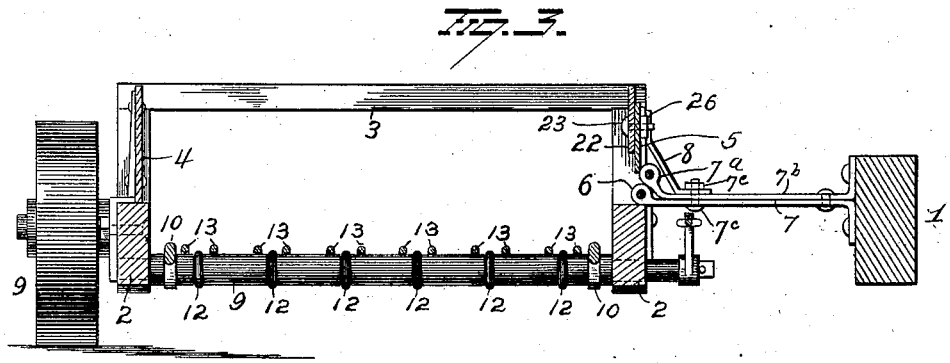
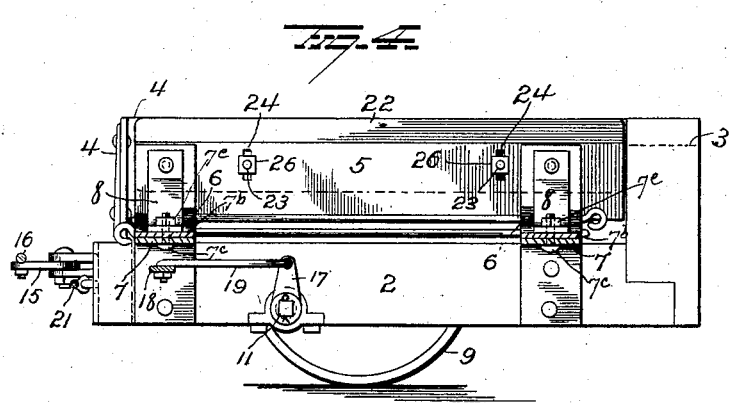
WITNESSES
INVENTORS

UNITED STATES PATENT OFFICE.

HENRY FERRIS AND HORACE E. DIKEMAN, OF ARDOCH, NORTH DAKOTA.

BUNDLE CARRIER AND DROPPER FOR HARVESTING-MACHINES.

No. 889,672.　　　　Specification of Letters Patent.　　　　Patented June 2, 1908.

Application filed April 13, 1907. Serial No. 367,959.

*To all whom it may concern:*

Be it known that we, HENRY FERRIS and HORACE E. DIKEMAN, of Ardoch, in the county of Walsh and State of North Dakota, have invented certain new and useful Improvements in Bundle Carriers and Droppers for Harvesting-Machines; and we do hereby declare the following to be a full, clear, and exact description of the invention, such as will enable others skilled in the art to which it appertains to make and use the same.

Our invention relates to an improvement in bundle carriers and droppers for harvesting machines,—one object of the invention being to so construct the device that the support for the bundles can be brought close to the ground in dumping and so that any short or loose grain or bundles that may have fallen on the carrier can be pushed therefrom.

A further object is to provide a bundle carrier which may be adapted to a harvester of any make and to construct the device in such manner that the working parts of the binder will be protected from grain discharged into the carrier.

A further object is to provide improved means for connecting the device with the frame of the harvester in such manner that it can be supported upon the ground and adapt itself to the unevenness of the same.

With these objects in view the invention consists in certain novel features of construction and combinations of parts as hereinafter set forth and pointed out in the claims.

In the accompanying drawings, Figure 1 is a plan view illustrating my improvements. Fig. 2 is a longitudinal sectional view. Fig. 3 is a transverse sectional view, and Fig. 4 is a side view, partly in section.

1 represents a portion of the frame of a harvester and 2 the frame of the bundle carrier, the latter being made rectangular in form, having its rear end open and provided with a cross-bearer 3 supported above this open end. The frame 2 is provided at its front end and outer side with boards or extensions 4 to give sufficient depth to the carrier and enable the same to contain enough bundles to make a shock.

Arms 7, are secured at one end to the portion 1 of the harvester frame, and at their other ends, said arms are connected with the bundle carrier frame by means of hinges 6, the bundle carrier thus having a hinged construction with the frame of the harvester. Other arms $7^b$ are disposed upon the arms 7 and are also secured at one end with the portion 1 of the harvester frame. To the other ends of the arms $7^b$, a board 5 is connected by means of hinges $7^a$, said board 5 being located at the side of the bundle carrier frame nearest the harvester frame. Braces 8 are secured at their upper ends to the hinged board 5, and at their lower ends, these braces are adjustably connected with the arms 7, $7^a$ by means of bolts $7^c$ projecting upwardly from the latter and passing through elongated slots $7^d$ in the braces, said bolts being provided with nuts $7^e$. The outer side of the hinged carrier frame 2 is supported by a ground wheel 9 which may if desired be mounted in vertically adjustable bearings.

The dumping bottom of the carrier comprises a rectangular frame 10 disposed transversely of the carrier frame and secured rearwardly of its center to a shaft 11 mounted transversely in the frame 2 of the carrier, and rearwardly projecting fingers 12 pivotally attached to the shaft 11 and normally resting upon the rear member of the rectangular frame 10. The rectangular-frame 10 is provided with several pairs of cross rods or wires 13 between which the pivoted ends of the fingers 12 are disposed.

The dumping bottom of the carrier is maintained normally in position to receive bundles of grain as they come from the harvester, by means of a spring pressed bolt 14 mounted in the forward end of the frame 2 and engaging the front end of the rectangular frame 10 of the dumping bottom. One arm of a bell-crank-lever 15 pivoted to the carrier frame 2, is connected with the bolt 14 and the other arm of said lever has connected with it, a rod 16 to be attached to a suitable hand or foot lever (not shown) located in position to be operated for withdrawing the bolt when it is desired to dump the carrier.

The shaft 11, with which the dumping bottom of the carrier is connected, projects laterally from the inner side of the frame 2 and is provided with a crank-arm 17. A bell-crank-lever 18 is pivotally attached to one of the brace-arms 7 and a rod 19 is attached at one end to one arm of this bell-crank-lever and at its other end to the crank-arm 17 on the shaft 11. An operating rod 20 is attached to the other arm of the bell-crank-lever 18 and extends to a suitable operating lever (not shown).

The carrier is connected with the pole or truck of the binder by means of a draft-rod 21 which is so attached to the carrier frame that the line of draft will equalize the draft of the binder and reduce to a minimum any side draft which the mounting of the carrier on the ground might otherwise occasion.

In order that the carrier may be made readily adaptable to harvesters of various constructions the hinged side-board 5 of the carrier is provided with a supplemental board 22 which is secured thereto so as to be adjustable vertically. A convenient means of affording such adjustment consists of threaded bolts 23 passing through the supplemental-board 22 and through elongated slots 24 in the hinged board 5, nuts 26 being provided on these bolts whereby the supplemental board can be secured at any desired vertical adjustment.

When it is desired to dump the bottom of the carrier to discharge the bundles therefrom, the operator will manipulate the devices connected with the bolt 14 to withdraw the latter. The weight of the bundles will now cause the bottom of the carrier to turn and the pivoted fingers to rest upon the ground, and as the carrier moves forward the bundles of grain will be discharged. Short bundles may have been discharged upon the forward portion of the dumping bottom and in order that such short bundles shall be discharged from the carrier the operator may manipulate the rod 20 and transmit motion to the crank-arm 17 to turn the rectangular frame 10 of the dumping bottom and thus cause said frame to push the short bundles rearwardly and insure their discharge from the carrier. By manipulating the rod 20 in the reverse direction the shaft 11 will be turned and the dumping bottom of the carrier will be righted and the spring pressed bolt will operate automatically to retain it in its normal position to again receive bundles of grain from the harvester.

By hinging the carrier to the frame of the harvester and supporting its outer side by means of a ground wheel, said carrier will readily adapt itself to the unevenness of the ground over which it travels.

Various slight changes might be made in the details of construction without departing from the spirit of our invention or limiting its scope and hence we do not wish to restrict ourselves to the precise details herein set forth.

Having fully described our invention what we claim as new and desire to secure by Letters-Patent, is,—

1. The combination with a harvester frame, of a bundle carrier hinged thereto for vertical movement and a ground wheel at the outer side of said carrier for supporting the same on the ground.

2. The combination with a harvester frame and a bundle carrier, of a board at the inner side of the frame of the carrier and arms connecting said board with the frame of the harvester said board being hinged to said arms.

3. The combination with a harvester frame and a bundle carrier, of a board at the carrier frame, arms secured to the harvester frame and braces connecting said arms and hinged board said board being hinged to said arms.

4. The combination with a harvester frame and a bundle carrier, of a board at the inner side of the carrier frame, means connecting said board and the carrier frame with the harvester frame, said board hinged to said means and a wheel at the outer side of the carrier frame for supporting the latter on the ground.

5. The combination with a harvester frame and a bundle carrier connected therewith, of a board at the inner side of the bundle carrier frame and a vertically adjustable board secured to the first mentioned board.

6. A bundle carrier comprising a frame, a shaft mounted therein, a dumping bottom secured to said shaft and comprising a rectangular frame and a series of rearwardly projecting fingers pivotally attached to the shaft, means for retaining the dumping bottom in its normal position, and means for returning said dumping bottom to its normal position.

7. In a bundle carrier, the combination with a frame and a shaft mounted therein, of a dumping bottom comprising a rectangular frame secured to said shaft and a series of fingers pivotally attached to said shaft and normally resting upon said rectangular frame, means for releasing said dumping bottom, and means for turning said shaft and the rectangular frame secured thereto.

8. In a bundle carrier, the combination with a frame and a shaft mounted therein, of a dumping bottom comprising a frame secured to said shaft, several pairs of cross-rods secured to said frame, and a series of fingers pivotally attached to the shaft between the cross-rods and resting upon the rectangular frame in rear of the shaft, means for releasing the dumping bottom, and means for turning the shaft and the rectangular frame secured thereto.

9. The combination with a frame and a shaft mounted therein, of a dumping bottom supported by said shaft and comprising a rectangular frame secured to the shaft and a series of fingers pivotally attached to the shaft and resting on the same in rear of the shaft, a bolt for retaining the dumping bottom in its normal position, and means connected with the said shaft for turning the same in both directions, whereby said rectangular frame may be operated in one direction to discharge short bundles and in the other direction to right the dumping bottom.

In testimony whereof, we have signed this specification in the presence of two subscribing witnesses.

HENRY FERRIS.
HORACE E. DIKEMAN.

Witnesses:
C. W. DENNISTON,
B. A. STOUGHTON.